(12) United States Patent
Mozolewski

(10) Patent No.: US 10,454,709 B2
(45) Date of Patent: Oct. 22, 2019

(54) DELIVERING MESSAGES ACCORDING TO A DESIRED DELIVERY ORDER IN A SOFTWARE DEFINED NETWORK

(71) Applicant: HEWLETT PACKARD ENTERPRISE DEVELOPMENT LP, Houston, TX (US)

(72) Inventor: Mark Brian Mozolewski, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 78 days.

(21) Appl. No.: 15/314,547

(22) PCT Filed: Jun. 2, 2014

(86) PCT No.: PCT/US2014/040479
§ 371 (c)(1),
(2) Date: Nov. 29, 2016

(87) PCT Pub. No.: WO2015/187119
PCT Pub. Date: Dec. 10, 2015

(65) Prior Publication Data
US 2017/0195134 A1    Jul. 6, 2017

(51) Int. Cl.
*H04L 12/46*   (2006.01)
*H04L 12/771*   (2013.01)
(Continued)

(52) U.S. Cl.
CPC ........ *H04L 12/4633* (2013.01); *H04L 45/021* (2013.01); *H04L 45/56* (2013.01);
(Continued)

(58) Field of Classification Search
CPC ......... H04L 45/00; H04L 45/02; H04L 45/04; H04L 45/43; H04L 45/46; H04L 45/64; H04L 45/38; H04L 45/7457
See application file for complete search history.

(56) References Cited

U.S. PATENT DOCUMENTS 7,505,418 B1    3/2009   Liang et al.
2007/0014287 A1   1/2007   Boukaert et al.
(Continued)

FOREIGN PATENT DOCUMENTS

WO   WO-2012/177213 A2   12/2012
WO   WO-2014/021861 A1    2/2014

OTHER PUBLICATIONS

International Search Report and Written Opinion, International Application No, PCT/US2014/040479, dated Feb. 11, 2015, pp. 1-9, KIPO.
(Continued)

*Primary Examiner* — Un C Cho
*Assistant Examiner* — Peter K Mak
(74) *Attorney, Agent, or Firm* — Hewlett Packard Enterprise Patent Department

(57) ABSTRACT

Described herein are techniques enabling the delivery of messages according to a desired delivery order in a software defined network. A desired delivery order for messages sent to multiple nodes in a cluster can be received. The cluster can be associated with a distributed application and the nodes in the cluster can be interconnected via the software defined network. The software defined network can be configured to deliver the messages according to the desired delivery order.

20 Claims, 3 Drawing Sheets

(51) Int. Cl.
*H04L 12/755* (2013.01)
*H04L 12/801* (2013.01)
*H04M 7/12* (2006.01)
*H04L 29/08* (2006.01)
*H04L 12/715* (2013.01)

(52) U.S. Cl.
CPC .............. *H04L 45/64* (2013.01); *H04L 47/10* (2013.01); *H04L 47/12* (2013.01); *H04L 67/34* (2013.01); *H04M 7/128* (2013.01)

(56) References Cited

U.S. PATENT DOCUMENTS

| | | |
|---|---|---|
| 2009/0180393 A1 | 7/2009 | Nobuyuki |
| 2013/0201821 A1 | 8/2013 | Yamato et al. |
| 2013/0232164 A1 | 9/2013 | Bigney |
| 2013/0250797 A1 | 9/2013 | Itoh |
| 2014/0064066 A1 | 3/2014 | Lumezanu et al. |
| 2015/0244607 A1* | 8/2015 | Han ........................ H04L 45/02 370/254 |
| 2015/0319089 A1* | 11/2015 | Liu ........................ H04L 45/745 370/392 |
| 2016/0156504 A1* | 6/2016 | Wang .................. H04L 41/0695 370/217 |
| 2016/0197831 A1* | 7/2016 | De Foy ............... H04L 45/7453 370/392 |
| 2016/0315880 A1* | 10/2016 | Guo ........................ H04L 43/04 |
| 2016/0330167 A1* | 11/2016 | Cai ........................ H04L 61/103 |

OTHER PUBLICATIONS

Michael Kennedy, "Transport SDN: A New Flavor for Software Defined Networking," Jul. 8, 2013, pp. 1-3, FierceTelecom, Available at: <fiercetelecom.com/story/transport-sd n-new-flavor-software-defined-networking/2013-07-08 >.

* cited by examiner

DELIVERING MESSAGES ACCORDING TO A DESIRED DELIVERY ORDER IN A SOFTWARE DEFINED NETWORK

BACKGROUND

Distributed processing applications (e.g., a Hadoop MapReduce application) can execute workloads over a cluster of compute nodes, such as a plurality of servers. The compute nodes may be interconnected by a network, such as a software defined network. The compute nodes send messages to each other in order to coordinate processing of the workloads.

BRIEF DESCRIPTION OF DRAWINGS

The following detailed description refers to the drawings, wherein.

DETAILED DESCRIPTION

Figure 1:
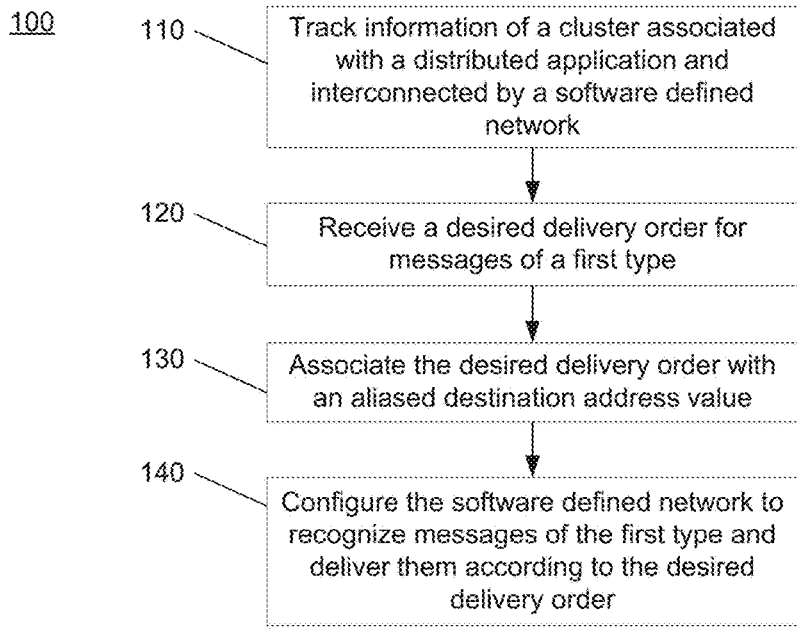
FIG. 1 illustrates a method to enforce message delivery order in a distributed processing system using a software defined network, according to an example.

As described above, distributed processing systems, such as Hadoop MapReduce, are designed such that individual nodes in a cluster can work together to perform workloads. These nodes send messages to each other in order to coordinate processing of the workloads. Distributed processing applications often require a specific sequence of message delivery to nodes in the cluster. This may be required so as to maintain consistent updated states of each node. This also may be required because certain nodes will take certain actions in response to receiving a particular message, which actions could negatively impact the distributed processing system if they are taken at the wrong time. Other reasons for requiring a particular delivery order may exist, as well.

According to the techniques described herein, a software defined network (SDN) interconnecting the nodes in a cluster associated with a distributed application may be used to enforce a desired delivery order of messages between nodes in the cluster. In particular, a SDN controller's global view of the network and control of the network devices can be leveraged to configure the network to deliver messages according to the desired delivery order. This can reduce the burden on the distributed application in having to ensure proper delivery of messages and can result in faster in-order message delivery. Additionally, this can reduce the burden on the nodes themselves, as the nodes can simply send messages according to these techniques and can trust that the network will appropriately deliver the messages.

In an example embodiment, a method may be provided to enforce message delivery order in a distributed processing system using a software defined network. The method can be performed by a processor, such as a processor in an SDN controller or in a computer executing an SDN application. The distributed processing system can be a Hadoop MapReduce system. The processor can track information of a cluster associated with a distributed application in the distributed processing system, the cluster including multiple nodes. The processor can receive a desired delivery order for messages of a first type to be sent to a set of nodes in the cluster and can associate the desired delivery order with an aliased destination address value. The processor can configure the software defined network to recognize messages of the first type based on a destination address of the messages matching the aliased destination address value, and further to deliver messages of the first type to the set of nodes according to the desired delivery order. For example, the processor can send flow table modification messages to network devices in the network to add flow table entries to their flow tables that include instructions to deliver messages matching the aliased destination address value to the set of nodes according to the desired delivery order. Additional examples, advantages, features, modifications and the like are described below with reference to the drawings.

Figure 2:
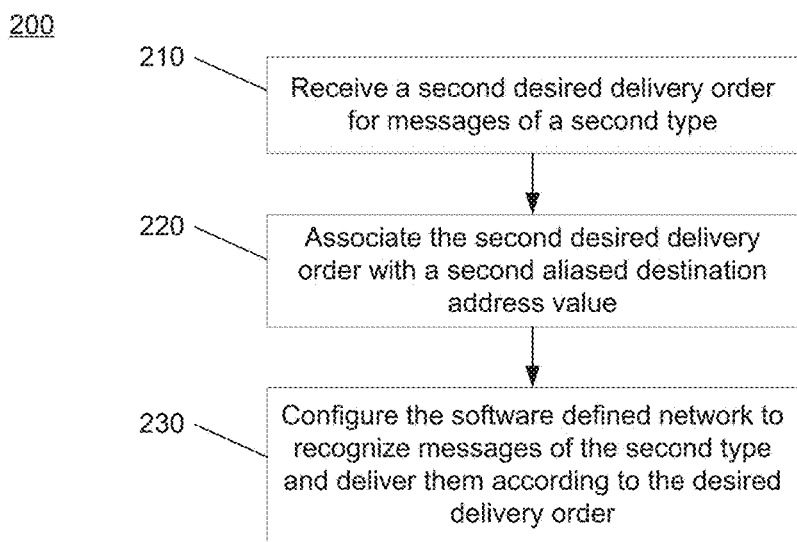
FIG. 2 illustrates a method to enforce message delivery order in a distributed processing system using a software defined network, according to an example.

FIGS. 1 and 2 illustrate methods to enforce message delivery order in a distributed processing system using a software defined network, according to examples. Methods 100 and 200 may be performed by a computing device, system, or computer, such as controller 310 or computer 410. Computer-readable instructions for implementing methods 100 and 200 may be stored on a computer readable storage medium. These instructions as stored on the medium are referred to herein as "modules" and may be executed by a computer.

Figure 3:
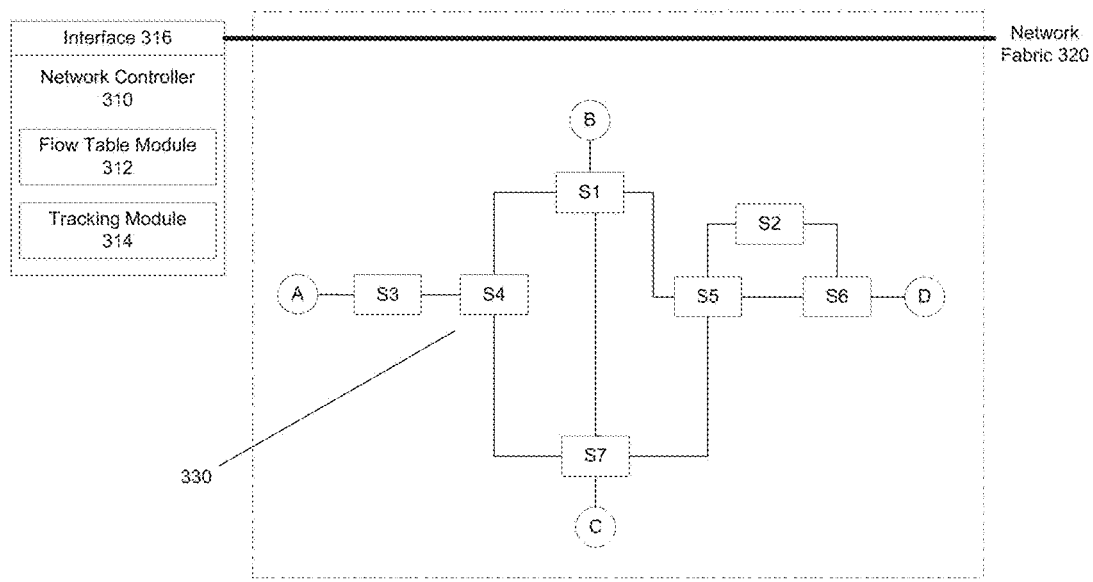
FIG. 3 illustrates a software defined network controller to enforce message delivery order in a distributed processing system, according to an example.

Methods 100 and 200 will be described here relative to environment 300 of FIG. 3. Environment 300 may include and/or be implemented by one or more computers. For example, the computers may be server computers, workstation computers, desktop computers, laptops, mobile devices, or the like, and may be part of a distributed system. The computers may include one or more controllers and one or more machine-readable storage media.

A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, system 300 may include one or more machine-readable storage media separate from the one or more controllers.

Environment 300 may include a number of components. For example, environment 300 may include a network controller 310, a network fabric 320 including multiple network devices S1-S7, and an interconnected cluster of compute nodes 330. The interconnected cluster 330 can include multiple compute nodes A-D interconnected by the network devices S1-S7 of network fabric 320. The cluster of computer nodes A-D may be part of a distributed processing system, which can include additional components not shown, such as a global controller executing a distributed processing application. The environment may also include multiple databases storing data.

Environment 300 may be interconnected via network fabric 320. Network fabric 320 may be part of a Software Defined Network (SDN) controlled by one or more network controllers 310. Network fabric 320 may include wired and wireless network devices S1-S7, such as switches, routers, bridges, wireless access points, and the like. An SDN network separates the control plane from the data plane, such that a network controller (here, network controller 310) can make decisions regarding where and how network traffic is to be sent while the data plane (here, network fabric 320) can be programmed by the network controller to forward and manipulate the traffic. There is also an application plane including one or more SDN applications whose functionality can be implemented by the network controller. In FIG. 3, the flow table module 312, tracking module 314, and interface 316 represent functionality of an SDN application implemented by network controller 310. In some examples, the SDN application may be implemented on one or more computers separate from the network controller 310. These one or more computers may host the SDN application and interface with the network controller 310. For purposes of this application, either scenario is intended to be covered when referring to a network controller, such as network controller 310.

Network controller 310 may have other functionality for managing network fabric 320 in accordance with the SDN paradigm. An example communications protocol for implementing an SDN network is OpenFlow. Examples in this disclosure are explained with reference to an OpenFlow implementation of an SDN network. As will be appreciated by one of ordinary skill in the art, the described examples may be implemented using other SDN communications protocols.

According to an OpenFlow implementation, switches in network fabric 320 store one or more flow tables for matching and forwarding network traffic received by the switch. The traffic is in the form of packets. The flow tables may include multiple flow table entries including various fields and corresponding information.

A flow table entry may include match fields and instructions, as well as other fields not discussed here. The match fields are used to determine whether a received packet matches the flow table entry. For example, as used here, the match fields include the destination node for the packet. The instructions are instructions to modify an action set or pipeline processing for the packet. In brief, the action set is the set of actions that will be applied to the packet, such as modifying a destination address of the packet or adding a flag to the packet. In an example, the flag can be a value added to a field for matching purposes. That is, a specific field can be designated for the flag, such that the field can be used to determine whether the packet matches the flow table entry. The field used for the flag may be a field selected because it is expected to be unused in the implementation. There are various fields in the OpenFlow specification that could potentially be used. For instance, the tunnel ID field or the MPLS label field are possible candidates. The pipeline processing refers to further processing through other flow tables stored in the switch. The flow table entry may have other fields and information, consistent with OpenFlow.

Flow table entries in a switch can be created or modified using flow table modification messages (sometimes referred to as "flowmods"). The flow table modification messages may be sent to the switch from the network controller, thus enabling the network controller to program the network fabric 320 to handle network traffic in particular ways. Upon receiving a flow table modification message, a network device S1-S7 updates its flow table(s) to include a corresponding flow table entry. In some cases a new flow table entry is created based on the flowmod. In other cases, an existing flow table entry is modified based on the flowmod.

As described previously, distributed processing systems are designed such that individual nodes in a cluster can work together to perform workloads. These nodes send messages to each other in order to coordinate processing of the workloads. However, distributed processing applications often require a specific sequence of message delivery to nodes in the cluster. This may be required so as to maintain consistent updated states of each node. This also may be required because certain nodes will take certain actions in response to receiving a particular message, which actions could negatively impact the distributed processing system if they are taken at the wrong time. Other reasons for requiring a particular delivery order may exist, as well. Some mechanism is thus needed to enforce a desired delivery order of messages between nodes in the distributed system.

Method 100 may be used to enforce message delivery order in a distributed processing system using a software defined network, according to an example. Method 100 may be executed by network controller 310. In particular, for example, method 100 may be executed by an application executed by network controller 310 designed to interoperate with distributed applications to enforce message delivery order. This application is referred to herein as a coordinating application.

Method 100 may begin at 110, where information of a cluster associated with a distributed application may be tracked. The tracking may be performed by tracking module 314. The cluster may include multiple nodes, such as nodes A-D. The nodes A-D may be interconnected by network devices S1-S7 of a software defined network. The tracked information may include cluster membership (e.g., certain nodes may be decommissioned and may no longer be part of the cluster, while new nodes may join the cluster), status of each node in the cluster (e.g., availability), and the like. The information can be received, such as via interface 316, from the nodes A-D in the cluster and/or from a global controller associated with the distributed system.

At 120, a desired delivery order for messages of a first type to be sent to a set of nodes in the cluster may be received via interface 316. The desired delivery order may be received from the distributed application. The desired delivery order may be a particular order that messages of the first type are to be delivered to all of the nodes in the cluster. For example, the desired delivery order may be A→B→C→D or D→C→B→A, or some other order. Alternatively, the desired delivery order may be for a subset of nodes in the cluster, such as A→B→C, D→C→A, or the like. Messages of the first type may be any type of messages that are intended to be delivered according to the desired delivery order. In other words, "of the first type" is merely meant to signify that the messages that the particular delivery order will be applied to might be all of or just some subset of messages exchanged between nodes. For example, messages of the first type might be all messages, status messages, messages sent from a particular node, messages sent at a particular time, messages containing certain data, or the like. Accordingly, as will be described later with respect to FIG. 2, there may be different desired delivery orders for different classes, groupings, or kinds of messages.

At 130, the desired delivery order may be associated with an identifier, such as an aliased destination address value. For example, the aliased destination address value may be a particular IP address not associated with any nodes in the network. Such an IP address may thus be used to indicate that a particular message addressed to that IP address is meant to be delivered to nodes in the cluster according to the associated desired delivery order. The aliased destination address value associated with the desired delivery order may be shared with the distributed application and nodes A-D so that nodes A-D know to assign the aliased destination address value as the destination address for messages intended to be delivered according to the desired delivery order.

At 140, the software defined network may be configured to recognize messages of the first type and deliver them according to the desired delivery order. In particular, the network may be configured to recognize messages of the first type based on a destination address of the messages matching the aliased destination address value. Thus, having recognized a message as a message of the first type, the network can deliver the message according to the desired delivery order. This can be accomplished by sending flow modification messages to network devices S1-S7 via flow table module 312 of network controller 310.

Flow table module 312 can generate and send flow table modification messages to network devices S1-S7 to add flow table entries to their flow tables. The flow table entries are used to cause the network device to deliver messages matching the aliased destination address value to the appropriate nodes according to the desired delivery order. This will be illustrated with an example in reference to FIG. 3.

Assume that a distributed application wants to establish the desired delivery order A→B→C→D for certain types of messages. The distributed application, via one of nodes A-D, through a global controller, or otherwise, may send the desired delivery order to network controller 310. Network controller 310 may associate desired delivery order A→B→C→D with an aliased destination address value of IP Address X. Flow table module 312 may then configure the network devices S1-S7 to enforce the desired delivery order for these messages.

In particular, flow table module 312 may send a flow modification message to each network device directly connected to a node—network devices S3 (directly connected to node A), S1 (directly connected to node B), S7 (directly connected to node C), and S6 (directly connected to node D). The flow modification message sent to these network devices can cause them to add a flow table entry that includes a matching field associated with the aliased destination address value (i.e., IP Address X), such that any message having as its destination address IP Address X will be determined to match the flow table entry. The flow table entry may also include instructions to (1) modify the destination address of matched messages to the destination address of the first node in the desired delivery order (here, the destination address of node A), (2) add a flag to the matched message, and (3) forward the modified matched message to the first node. As described previously, the flag may be value added to an unused field for matching purposes. The flag serves to distinguish a message intended to be delivered according to the desired delivery order from a message intended solely for the node identified by the modified destination address.

Flow table module 312 may also send additional flow modification messages to the nodes to enforce the desired delivery order. For example, flow table module 312 may send an additional flow modification message to each network device directly connected to a node so as to cause that network device to add an additional flow table entry for matching a message of the first type that has been modified. That is, now that the IP Address X has been replaced, an additional flow table entry with new matching fields will enable the matching of the message. For instance, an additional flow table entry for network device S3 (directly connected to node A) may include a first matching field associated with the destination address of node A and a second matching field associated with the flag. The flow table entry may also include instructions to (1) deliver a matched message to node A, (2) copy the matched message, (3) modify the destination address of the copied message to a destination address of the next node in the desired delivery order (here, node B), and (4) forward the modified copied message to the next node (B). Similar flow table entries may be added to S7 and S6, with appropriate modifications according to the destination addresses of the respective node and the respective next node in the desired delivery order.

Now, assume that node B needs to send a message according to the desired delivery order. Node B may assign IP Address X as the destination address of the message and send the message to network device S1. S1 matches the message with the flow table entry having IP Address X as a match field. S1 then executes the instructions included in the matched flow table entry: S1 modifies the destination address to the address of A, adds a flag to the message, and forwards the message to S4 for delivery to A. S4 matches the message to a flow table entry based on the destination address of A and forwards the message to S3. S3 matches the message to the flow table entry having A's destination address and the flag. S3 then executes the instructions included in the matched flow table entry: S3 delivers the message to A, copies the message, modifies the destination address of the copied message to the destination address of B, and forwards the modified copied message to S4 for delivery to B. S4 matches the message to a flow table entry based on the destination address of B and forwards the message to S1. S1 matches the message to the flow table entry having B's destination address and the flag. S1 then executes the instructions included in the matched flow table entry: S1 delivers the message to B, copies the message, modifies the destination address of the copied message to the destination address of C, and forwards the modified copied message to S7 for delivery to C. S7 matches the message to the flow table entry having C's destination address and the flag. S7 then executes the instructions included in the matched flow table entry: S7 delivers the message to C, copies the message, modifies the destination address of the copied message to the destination address of D, and forwards the modified copied message to S5 for delivery to D. S5 matches the message to a flow table entry based on the destination address of D and forwards the message to S6. S6 matches the message to the flow table entry having D's destination address and the flag. S6 then executes the instructions included in the matched flow table entry: S6 delivers the message to A. Accordingly, the software defined network caused the message originally sent by node B to be delivered according to the desired delivery order A→B→C→D.

Many variations can be made to the techniques described above. For example, the network device directly connected to a node can remove the flag from the message before passing the message to the node. Additionally, a flag may not be used for a copied message when it is passed to the final node in the desired delivery order, as there may no longer be a need to identify the message as being of the first type since it is addressed to its final destination node.

Additionally, network controller 310 may reconfigure the network to deliver messages according to the desired delivery order based on changes to the network or nodes. Network changes may include changes to network topology and changes to the nodes may include changes to the health of the nodes and changes to locations of the nodes. The network topology and condition information may be visible to network controller 310 in the normal course of operating the SDN network. The health of the nodes can be reported to the coordinating application executed by the network controller 310 by the nodes themselves or by a global controller for the nodes. Similarly, the coordinating application can keep track of location changes of the nodes (e.g., a node being connected to a different network device).

FIG. 2 illustrates a method to enforce message delivery order in a distributed processing system using a software defined network, according to an example. In particular, method 200 illustrates how multiple desired delivery orders may be supported. Method 200 may begin at 210, where a second desired delivery order for messages of a second type may be received. At 220, the second desired delivery order may be associated with a second identifier, such as a second aliased destination address value (e.g., IP Address Y). At 230, the software defined network may be configured to recognize messages of the second type and deliver them according to the desired delivery order. This configuration can be accomplished through flow modification messages, as described with respect to FIG. 1, to cause the network devices to add additional flow table entries to their flow tables for recognizing and processing messages of the second type.

Figure 4:
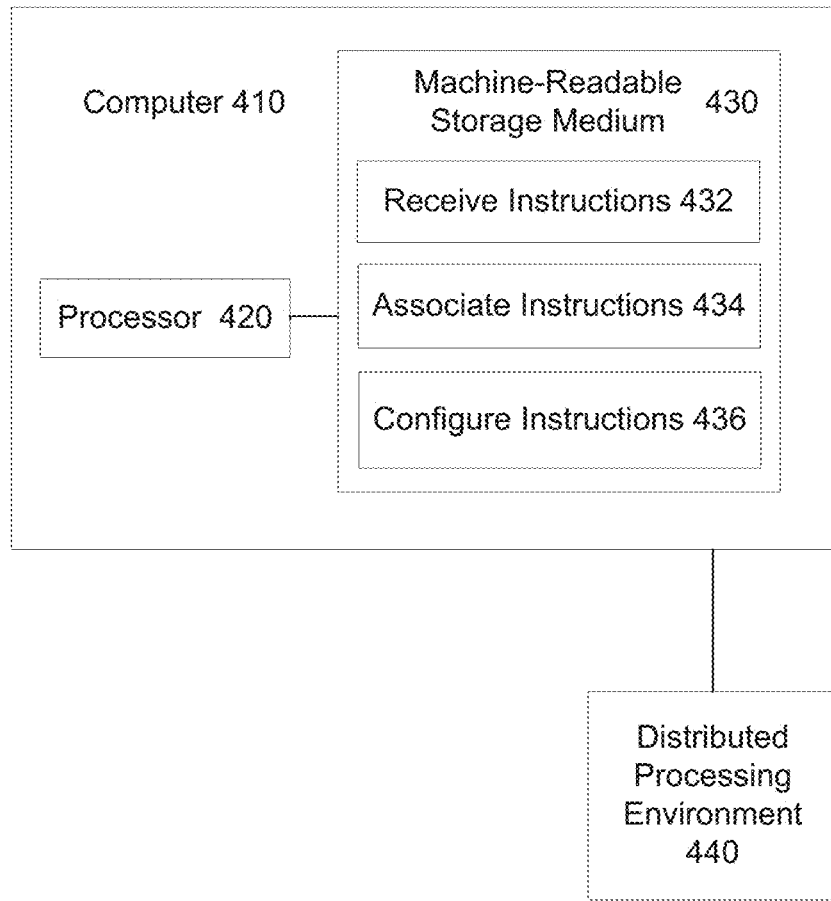
FIG. 4 illustrates a computer-readable medium to enforce message delivery order in a distributed processing system using a software defined network, according to an example.

FIG. 4 illustrates a computer-readable medium to enforce message delivery order in a distributed processing system using a software defined network, according to an example. Computer 410 may include and/or be implemented by one or more computers. For example, the computers may be server computers, workstation computers, desktop computers, laptops, mobile devices, or the like, and may be part of a distributed system. The computers may include one or more controllers and one or more machine-readable storage media, as described with respect to environment 300, for example.

In addition, users of computer 410 may interact with computer 410 through one or more other computers, which may or may not be considered part of computer 410. As an example, a user may interact with computer 410 via a computer application residing on a computer, such as a desktop computer, workstation computer, tablet computer, or the like. The computer application can include a user interface (e.g., touch interface, mouse, keyboard, gesture input device).

Computer 410 may perform methods 100 and 200, and variations thereof. Additionally, the functionality implemented by computer 410 may be part of a larger software platform, system, application, or the like. For example, computer 410 may be part of an SDN network and may implement a network controller for the SDN network, such as network controller 310. Alternatively, computer 410 may be separate from the network controller and may merely host an SDN application that interfaces with the network controller. Computer 410 may be connected to distributed processing environment 440 via a network. Distributed processing environment 440 may include a distributed processing system (e.g., Hadoop MapReduce) and an SDN network, such as shown in environment 300 of FIG. 3.

Processor 420 may be at least one central processing unit (CPU), at least one semiconductor-based microprocessor, other hardware devices or processing elements suitable to retrieve and execute instructions stored in machine-readable storage medium 430, or combinations thereof. Processor 420 can include single or multiple cores on a chip, multiple cores across multiple chips, multiple cores across multiple devices, or combinations thereof. Processor 420 may fetch, decode, and execute instructions 432-436 among others, to implement various processing. As an alternative or in addition to retrieving and executing instructions, processor 420 may include at least one integrated circuit (IC), other control logic, other electronic circuits, or combinations thereof that include a number of electronic components for performing the functionality of instructions 432-436. Accordingly, processor 420 may be implemented across multiple processing units and instructions 432-436 may be implemented by different processing units in different areas of computer 410.

Machine-readable storage medium 430 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 430 can be computer-readable and non-transitory. Machine-readable storage medium 430 may be encoded with a series of executable instructions for managing processing elements.

The instructions 432-436 when executed by processor 420 (e.g., via one processing element or multiple processing elements of the processor) can cause processor 420 to perform processes, for example, methods 100 and 200, and/or variations and portions thereof.

For example, receive instructions 432 may cause processor 420 to receive a desired delivery order for messages to be sent to a plurality of nodes in a cluster associated with a distributed application executing in a distributed processing environment. The cluster may be interconnected by a software defined network. Associate instructions 434 can cause processor 420 to associate the desired delivery order with an aliased destination address value. Configure instructions 436 can cause processor 420 to configure the software defined network to recognize the messages based on a destination address of the messages matching the aliased destination address value. Configure instructions 436 can additionally cause processor 420 to deliver the messages to the plurality of nodes according to the desired delivery order. This can be accomplished by sending flow table modification messages to network devices in the network to add flow table entries to their flow tables that include instructions to deliver messages matching the aliased destination address value to the plurality nodes according to the desired delivery order.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A controller of a software defined network (SDN), comprising:
a processor and memory including instructions that, when executed by the processor, cause the controller to:
receive an indication that a distributed application is executing on a plurality of nodes of the SDN;
receive a delivery order to the plurality of nodes for a first type of messages of the distributed application;
associate the received delivery order with an aliased IP address;
transmit commands to a plurality of network devices of the SDN to route received network traffic with a destination address matching the aliased IP address to a first node of the delivery order and to flag the network traffic with the destination address matching the aliased IP address; and
transmit commands to the plurality of network devices to route certain flagged received network traffic to a current node of the plurality of nodes, copy the received network traffic, and route the copied network traffic to a next node of the plurality of nodes.

2. The controller of claim 1, wherein the current node of the plurality of nodes is the first node in the delivery order that has not received a certain network packet of the distributed application.

3. The controller of claim 1, wherein network traffic sent from a first node of the plurality of nodes to the second node of the plurality of nodes without using the aliased IP address as a destination address is not flagged.

4. The controller of claim 1, wherein routing the received network traffic with the destination address matching the aliased IP address comprises replacing the destination address with an IP address of the first node and forwarding the received network traffic along a route to the first node.

5. The controller of claim 1, wherein routing the copied network traffic comprises replacing the destination address with an IP address of the next node and forwarding the received network traffic along a route to the next node.

6. The controller of claim 1, wherein the certain flagged received network traffic includes flagged network traffic received at a network device with a destination address corresponding to a destination node that is connected to the network device without another intervening network device of the plurality of network devices.

7. The controller of claim 1, wherein the instructions further cause the controller to:
receive a second delivery order to the plurality of nodes for a second type of messages of the distributed application;
associate the received second delivery order with a second aliased IP address; and
transmit commands to the plurality of network devices of the SDN to route received network traffic with a destination address matching the second aliased IP address to a first node of the second delivery order and to flag the network traffic with the destination address matching the second aliased IP address.

8. A method, comprising:
receiving, at a software defined network (SDN) controller, an indication that a distributed application is executing on a plurality of nodes of the SDN;
receiving, at the SDN controller, a first delivery order to the plurality of nodes for a first type of messages of the distributed application;
associating, by the SDN controller, the received first delivery order with a first aliased IP address;
transmitting, by the SDN controller, commands to a plurality of network devices of the SDN to route received network traffic with a destination address matching the first aliased IP address to a first node of the first delivery order and to flag the network traffic with the destination address matching the first aliased IP address;
transmitting, by the SDN controller, commands to the plurality of network devices to route certain flagged received first type network traffic to a current node of the first delivery order, copy the received first type network traffic, and route the copied first type network traffic to a next node of the first delivery order;
receiving, at the SDN controller, a second delivery order to the plurality of nodes for a second type of messages of the distributed application;
associating, by the SDN controller, the received second delivery order with a second aliased IP address;
transmitting, by the SDN controller, commands to a plurality of network devices of the SDN to route received network traffic with a destination address matching the second aliased IP address to a first node of the second delivery order and to flag the network traffic with the destination address matching the second aliased IP address; and
transmitting, by the SDN controller, commands to the plurality of network devices to route certain flagged received second type network traffic to a current node of the second delivery order, copy the received second type network traffic, and route the copied second type network traffic to a next node of the second delivery order.

9. The method of claim 8, wherein the first delivery order and the second delivery order are orders of delivering the first type of messages and the second type of messages, respectively, to nodes executing the distributed application in a desired sequence.

10. The method of claim 8, wherein the certain flagged received first type network traffic includes flagged first type network traffic received at a network device with a destination address corresponding to a destination node that is connected to the network device without another intervening network device of the plurality of network devices.

11. The method of claim 8, wherein the certain flagged received second type network traffic includes flagged second type network traffic received at a network device with a destination address corresponding to a destination node that is connected to the network device without another intervening network device of the plurality of network devices.

12. The method of claim 8, wherein routing the copied first type network traffic comprises replacing the destination address with an IP address of the next node of the first delivery order and forwarding the received network traffic along a route to the next node of the first delivery order.

13. The method of claim 8, wherein routing the copied second type network traffic comprises replacing the destination address with an IP address of the next node of the second delivery order and forwarding the received network traffic along a route to the next node of the second delivery order.

14. The method of claim 8, wherein network traffic sent from a first node of the plurality of nodes to the second node of the plurality of nodes without using the first or second aliased IP addresses as a destination address is not flagged.

15. A non-transitory, computer readable medium including instructions that, when executed by a processor, cause a device to:
   receive an indication that a distributed application is executing on a plurality of nodes of a software defined network (SDN);
   forward the indication to a SDN controller;
   receive a command from the SDN controller to route received network traffic with a destination address matching a first aliased IP address to a first node of a first delivery order and to flag the network traffic with the destination address matching the first aliased IP address;
   receive a command from the SDN controller to route certain flagged received network traffic to a current node of a second delivery order, copy the certain flagged received network traffic, and route the copied network traffic to a next node of the second delivery order;
   receive a first network packet with a destination address matching the first aliased IP address;
   flag the first network packet and route the first network packet to the first node of the first delivery order;
   receive a second network packet that is flagged; and
   route the second network packet to the current node of the second delivery order, copy the second network packet, and route the copied second network packet to the next node of the second delivery order.

16. The non-transitory, computer readable medium of claim 15, wherein the second network packet is flagged in a way that indicates that it is a message associated with the second delivery order.

17. The non-transitory, computer readable medium of claim 15, wherein flagging the first network packet comprises indicating that the first network packet is associated with the first delivery order.

18. The non-transitory, computer readable medium of claim 15, wherein the commands received from the SDN controller are flow modification commands.

19. The non-transitory, computer readable medium of claim 15, wherein the current node of the second delivery order is connected to the device without intervening SDN-capable network devices.

20. The non-transitory, computer readable medium of claim 15, wherein each node of the first delivery order and each node of the second delivery order are nodes of the plurality of nodes.

* * * * *